Patented Sept. 12, 1967

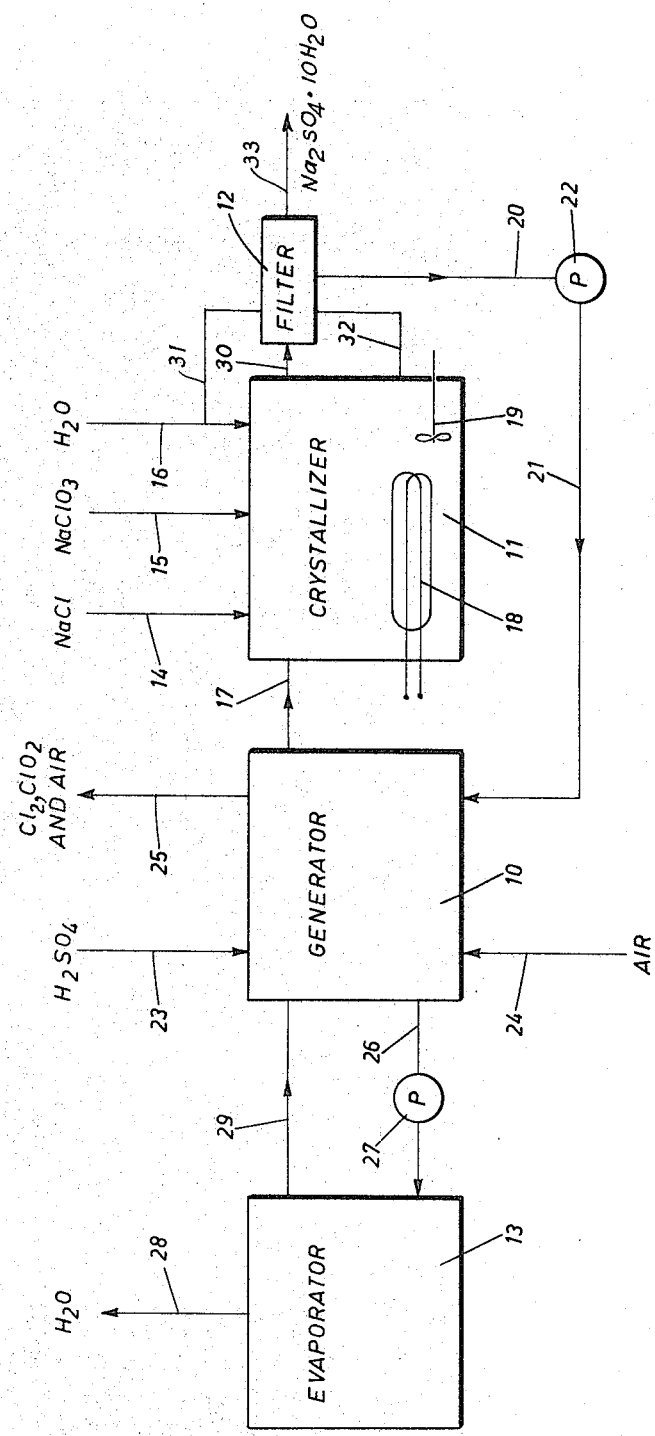

3,341,288
PRODUCTION OF CHLORINE DIOXIDE
Harold Devere Partridge, Youngstown, and Edward S. Atkinson, Lewiston, N.Y., and Herbert C. Scribner, Scarborough, Ontario, and William Howard Rapson, Toronto, Ontario, Canada, assignors to Hooker Chemical Corporation, Niagara Falls, N.Y., a corporation of New York
Filed Dec. 27, 1963, Ser. No. 333,872
14 Claims. (Cl. 23—152)

This invention relates to processes for the manufacture of chlorine dioxide and the recovery of hydrated sodium sulphate. More particularly, this invention relates to processes for the production of chlorine dioxide from sulphuric acid, chloride and chlorate and the recovery of hydrated sodium sulphate wherein the quantity of acid which is employed is minimized.

In the past it has been common practice to continuously react sodium chloride and sodium chlorate in a solution which contains 30 percent or more of sulphuric acid in accordance with Rapson, U.S. Patent No. 2,863,722. In this process a proportion of the reaction mixture is continuously removed from the chlorine dioxide generator as liquid effluent. In some cases it is possible to use this effluent from the chlorine dioxide generator or reaction zone as a weak acid so as to recover its acid values. For example, in mills producing pulp by the sulphate process, a portion of the liquid effluent from the chlorine dioxide generator is frequently injected into the pulping liquor recovery system to obtain benefit from its sulphur and sodium content.

Where the full value of the liquid effluent from the Rapson process (U.S. Patent 2,863,722) is being substantially utilized, it is the most economical process known for producing chlorine dioxide. In actual practice, however, there are situations where the effluent acid is not fully utilizable and this reduces the value of the sulphuric acid to its sulfur content or even less. Additional problems may also be created. Neutralization of sulfuric acid in the effluent may produce more salt cake than the black liquor recovery system can utilize. Sometimes the acidity of the effluent may cause lignin to precipitate from the black liquor which may cause fouling in the evaporators unless special precautions are taken.

Accordingly, it is an object of this invention to provide processes for the production of chlorine dioxide wherein a valuable by-product is obtained, problems associated with the handling of the effluent from the chlorine dioxide generator are eliminated, and the quantity of sulphuric acid required to be added to the process to produce a given amount of chlorine dioxide is reduced to a minimum.

In accordance with this invention a reaction zone and a crystallization zone are provided. The acidic effluent from the reaction zone together with sodium chloride, sodium chlorate and water are added to the crystallization zone. The solution in the crystallization zone is maintained at a sufficiently low temperature to crystallize hydrated sodium sulphate from the solution. The crystallized by-product is recovered from the solution, and the liquor remaining after recovery of the hydrated sodium sulphate is conducted to the reaction zone, where sulphuric acid is added thereto. Chlorine dioxide and chlorine are generated from the reaction mixture in the reaction zone. The chlorine dioxide and chlorine so generated are removed from the reaction zone by conventional means. The acidic effluent from the reaction zone is conducted to the crystallization zone, and water is removed from the reaction zone. The amount of water added to the crystallization zone from all sources is sufficient, at the temperature of the solution in the crystallization zone, to crystallize, hydrated sodium sulphate. In a continuous process the amount of sodium removed in the hydrated sodium sulfate is equivalent to substantially all of the sodium added to the crystallization zone in the form of sodium chlorate and sodium chloride.

In order to illustrate the economy of a process embodying this invention, it may be noted that the generally accepted quantities of material required to produce one pound of chlorine dioxide from sodium chlorate, sodium chloride and sulphuric acid are: 1.66 pounds of sodium chlorate, 0.95 pound of sodium chloride and 4.80 pounds of sulphuric acid. However, in accordance with a process embodying this invention, it is possible to produce one pound of chlorine dioxide from 1.66 pounds of sodium chlorate, 0.95 pound of sodium chloride and only 1.57 pounds of sulphuric acid, while 5.20 pounds of the valuable by-product, sodium sulphate decahydrate, are recovered from the process.

This invention will become more apparent from the following detailed description, taken in conjunction with the appended figure, which shows one way of carrying out a process embodying this invention.

Referring to the figure in the drawing, there is shown a reaction zone or chlorine dioxide generator 10, a crystallizer 11, a filter 12 and an evaporator 13. Sodium chloride is added to crystallizer 11 via line 14, while sodium chlorate and water are added to crystallizer 11 via lines 15 and 16 respectively. It is to be understood that at least a part of the water added in line 16 may be added with the $NaClO_3$ and $NaCl$ through lines 14 and 15 and also that the $NaClO_3$ and $NaCl$ may be added together through one of lines 14 or 15. The acidic effluent from reaction zone 10, which consists essentially of sulphuric acid, water and sodium value with some residual reactants and products, is added to crystallizer 11 via line 17 which connects reaction zone 10 and crystallizer 11. The crystallizer 11 is provided with a cooling means 18 for maintaining the contents at a suitable temperature and an agitation means 19 is employed to maintain the crystals of hydrated sodium sulphate in suspension.

The amount of liquid effluent to be added to the crystallizer is that amount which will provide approximately the stoichiometric quantity of sulphuric acid to react with the sodium introduced into the crystallizer with the sodium chloride and sodium chlorate feeds.

A portion of the solution in crystallizer 11 containing the suspended crystals of hydrated sodium sulphate overflows from crystallizer 11 through line 30 to a separation means shown as filter 12, where the hydrated sodium sulphate crystals are separated from the solution and removed through line 33. The mother liquor from filter 12, which is essentially a solution of chloric acid, hydrochloric acid, sodium sulphate and sulphuric acid, is returned to reaction zone 10 via lines 20 and 21 and a transfer means shown as pump 22. Sulphuric acid is added to this liquor in reaction zone 10 via line 23. Chlorine dioxide and chlorine are generated from the reaction mixture in reaction zone 10. Air or any other gas inert to chlorine dioxide is passed into reaction zone 10 via line 24 and bubbles through the reaction mixture therein to strip the chlorine dioxide and chlorine from the reaction mixture and to dilute the chlorine dioxide gas below the point where it is spontaneously explosive. The mixture of air, chlorine dioxide and chlorine is withdrawn from generator 10 via line 25, and the components of this mixture may be separated by any of the well known procedures.

A portion of the reactor liquid effluent is withdrawn from reaction zone 10 via line 26 and a transfer means shown as pump 27 and is passed into evaporator 13. In evaporator 13 water is evaporated from the effluent and withdrawn via line 28. The concentrated liquid effluent comprising mainly sulphuric acid sodium values and water is returned to reaction zone 10 via a line 29 which connects evaporator 13 and reaction zone 10.

In preferred practice the amount of water removed is limited by the solubility of the sodium salts in the concentrated liquid effluent.

A portion or all of the water which is added to crystallizer 11 via line 16 may be employed to wash the hydrated sodium sulphate crystals before the water is introduced to crystallizer 11. This may be done on the separation means shown as filter 12 by conventional means such that the washings are kept separate from the mother liquor from filter 12 and returned to the crystallizer. This may be done by conducting this water through line 31 to the washing zone in the separation means 12 and conducting it to the crystallizer through line 32.

The quantity of sulphuric acid added to reaction zone 10 via line 23 should be sufficient to provide the acidity required to cause the reaction:

$$HClO_3 + HCl \rightarrow ClO_2 + \tfrac{1}{2}Cl_2 + H_2O$$

which takes place in reaction zone 10, to proceed at an adequate rate and to replenish the sulphate ions which are removed in crystallizer 11 in the form of hydrated sodium sulphate. The range of generator acidities useful in this invention lies between about 4 and about 6 molar sulphuric acid, with a preferred range of about 5 to about 5.5 molar sulphuric acid. The quantities of sodium chloride and sodium chlorate which are added to the system should be sufficient to provide the amount of chlorine dioxide required.

The function of evaporator 13 is to remove water introduced into the system as well as that formed by the above reaction. It will be understood, however, that other means may be employed to remove this water, and that some of the water is removed by the hydrated sodium sulphate produced.

The minimum amount of water present in crystallizer 11 is that amount at which all of the sodium to be removed from the system will precipitate as hydrated sodium sulphate at the temperature of the contents of the crystallizer. This amount of sodium is substantially equivalent to the amount of sodium in the sodium chloride and sodium chlorate added to the system. This minimum amount of water varies with the quantities of reactants employed and with the normality of the reaction mixture in reaction zone 10. If less water than a quantity required to achieve the above effect is present in the solution in crystallizer 11, the formation and recovery of sodium compounds, which have the undesirable effect of removing chloride and/or chlorate from the system, may be encountered. The quantity of water added to crystallizer 11 determines the temperature at which to maintain the contents of the crystallizer to crystallize an amount of sodium in the form of hydrated sodium sulphate which is equivalent to substantially all of the sodium in the sodium chloride and sodium chlorate added to the system.

The operating conditions in the crystallizer may be varied with changes in other variables, such as (1) the acid concentration, which can be expressed in terms of normality, (2) the sodium sulfate concentration in the generator effluent being fed to the crystallizer, and (3) the temperature maintained in the crystallizer. Thus, there is an area of combinations of crystallizer normalities and crystallizer temperatures in which it has been discovered that the desired crystallization can be effected. At one border of this area ice forms. At another border sodium chlorate co-crystallizes. At another border insufficient $Na_2SO_4$ is removed and because of this, $NaHSO_4$ begins to crystallize out, first in the evaporator and subsequently in the generator. Within the area defined by these borders, the temperature is in a range between about −5 degrees centigrate and about −28 degrees centigrade, and the crystallizer normalities range from between about 1.5 Normal to about 4.6 Normal. Preferred conditions are −12 to −18 degrees centigrade and 3 to 4 Normal.

It will be understood that the crystallizer operating temperature and the amount of water added affect the costs of evaporation and refrigeration. It will also be understood that adding more water to crystallizer 11 will increase the amount of water that must be removed by evaporator 13. Therefore, operating costs are related to the costs of providing cooling and evaporation.

When a process embodying this invention is conducted in its most preferred manner, the quantity of sulfuric acid added to reaction zone 10 via line 23 is only that employed to form hydrated sodium sulfate from the sodium introduced to crystallizer 11 as chlorate and chloride, together with a small amount to make up for any incidental losses. Because all the unreacted chlorate and chloride ions are recycled within the system, the yield of chlorine dioxide is maintained at a high level. Accordingly, it will be seen that a process for minimizing the quantity of sulfuric acid used for the production of chlorine dioxide has been provided.

It is to be understood that a process embodying this invention may be operated on a batch basis, but preferably is operated as a continuous process. In this connection it should be noted that it is desirable to maintain the molarity of sulfuric acid in the reaction mixture in reaction zone 10 at a relatively constant value. The preferable range of molarity is between about 4–6, and within this range a molarity of about 5 is preferable.

For continuous operation sulfuric acid is added continuously to reaction zone 10, the reactor liquid effluent flows continuously to crystallizer 11 via line 17, sodium chloride, sodium chlorate and water are added continuously to crystallizer 11, the liquor from filter 12 is continuously fed to the reaction zone, and evaporator 13 operates on a continuous basis.

The following examples are given to further illustrate the invention. However, we do not wish to be limited to them except as defined in the appended claims.

EXAMPLE 1

1.68 lbs./time of 93 percent sulfuric acid were supplied to reaction zone 10 via line 23. Aqueous solutions containing 1.66 lbs./time of sodium chlorate, 0.96 lbs./time of solid sodium chloride and water to make a total of 8.75 lbs./time were added to crystallizer 11 via lines 14, 15 and 16, respectively, and were mixed with 4.75 lbs./time of reactor effluent added to crystallizer 11 via line 17. The solution in crystallizer 11 was maintained at a temperature of −15 degrees centigrade by cooling coil 18 and 5.18 lbs./time of sodium sulfate decahydrate crystals were recovered. 6.25 lbs./time of water were evaporated in evaporator 13 from 84.6 lbs./time of the liquid reactor effluent conducted from reaction zone 10 to evaporator 13. 0.935 lb./time of chlorine dioxide and 0.525 lb./time of chlorine were produced in reaction zone 10 and removed via line 25. 0.065 lb./time of chlorine dioxide and 0.036 lb./time of chlorine were recovered from evaporator 13. The molarity of the reaction mixture in reaction zone 10 was about 5 and the crystallizer solution calculated normality was 3.5.

In this specific example not less than 5.88 lbs./time of water should be added to crystallizer 11 via lines 14, 15 and 16, so as to ensure that substantially all of the sodium added to crystallizer 11 as chloride and chlorate is recovered as hydrated sodium sulfate. If only 5.88 lbs./time of water are added to crystallizer 11 via lines 14, 15 and 16, the temperature of the solution in crystallizer 11 should be maintained at −26.5 degrees centigrated to obtain the desired result. This is shown in Example 2.

EXAMPLE 2

In a manner after Example 1, the following feeds were made:

Input

| | | |
|---|---|---|
| NaClO₃ feed to crystallizer | g./hr | 305 |
| NaClO₃ concentration in feed | | 3.2 M |
| NaCl feed to crystallizer | g./hr | 177 |
| NaCl concentration in feed | | 3.36 M |
| Volume of combined feed | ml./hr | 895 |
| H₂O feed to crystallizer | ml./hr | 372 |
| Waste acid feed to crystallizer | ml./hr | 600 |
| H₂SO₄ feed to crystallizer (in waste acid) | g./hr | 294 |
| H₂SO₄ concentration in effluent | | 10 N |
| Acidity in crystallizer | | 4.3 N |
| Temperature in crystallizer | °C | −26.5 |
| H₂SO₄ feed to generator (93% acid) | g./hr | 332 |

Output

The products were:

| | | |
|---|---|---|
| Na₂SO₄·10H₂O | g./hr | 950 |
| Na₂SO₄ in crystals | g./hr | 420 |
| H₂O in crystals | g./hr | 530 |
| ClO₂ produced | g./hr | 184 |
| Cl₂ produced | g./hr | 105 |
| H₂O in gas (estimated) | g./hr | 26 |
| H₂O evaporated | g./hr | 621 |

EXAMPLE 3

A pilot plant of the process shown in the figure was operated for an extended period under the following conditions:

Input

| | | |
|---|---|---|
| NaClO₃ feed to crystallizer | g./hr | 311 |
| NaClO₃ concentration in feed | | 3.18 M |
| NaCl feed to crystallizer | g./hr | 180 |
| NaCl concentration in feed | | 3.35 M |
| Volume of combined feed | ml./hr | 922 |
| H₂O feed to crystallizer (part of this had been first used for washing crystals prior to entering the crystallizer) | ml./hr | 719 |
| Waste acid feed to crystallizer | ml./hr | 615 |
| H₂SO₄ feed to crystallizer (in waste acid) | g./hr | 294 |
| H₂SO₄ concentration in waste acid | | 9.75 N |
| Acidity in crystallizer | | 3.9 N |
| Temperature in crystallizer | °C | −15 |
| H₂SO₄ feed to generator (93% acid) | g./hr | 316 |

Output

The products were:

| | | |
|---|---|---|
| Na₂SO₄·10H₂O | g./hr | 1019 |
| Na₂SO₄ in crystals | g./hr | 427 |
| H₂O in crystals | g./hr | 592 |
| ClO₂ produced | g./hr | 184 |
| Cl₂ produced | g./hr | 106 |
| H₂O in gas (estimated) | g./hr | 26 |
| H₂O evaporated | g./hr | 946 |

It should be noted that the hydrated sodium sulfate produced in accordance with this invention generally will be recovered in the form of sodium sulfate decahydrate, but it will be appreciated that under certain conditions sodium sulfate heptahydrate may be produced and recovered.

If desired the sodium chloride and sodium chlorate may be added in aqueous solution which will reduce the amount of water required to be added to crystallizer 11 via line 16.

While it might be anticipated from the foregoing that chlorine dioxide would be produced in crystallizer 11, since chloride, chlorate and hydrogen ions all are present therein, it has been found in practice that the production of chlorine dioxide in crystallizer 11 occurs at such a slow rate due presumably to the low acidity, that the quantity of chlorate reacted is insignificant.

In the practice of this invention wherein the chlorate ions and chloride ions are introduced into the crystallizing zone, it is to be understood that part or all of the chloride ion can be supplied by feeding hydrogen chloride, as well as by sodium chloride.

While preferred embodiments of this invention have been disclosed herein, those skilled in the art will appreciate that changes and modifications may be made therein without departing from the spirit and scope of this invention as defined in the appended claims.

We claim:

1. A process for the production of chlorine dioxide and the recovery of hydrated sodium sulphate which comprises maintaining a reaction zone for the production of chlorine dioxide and a crystallization zone for the crystallization of hydrated sodium sulphate, adding sodium chloride, sodium chlorate, water and liquid effluent from said reaction zone to said crystallization zone, maintaining the solution in said crystallization zone at a temperature sufficiently low to crystallize hydrated sodium sulphate therefrom, recovering said hydrated sodium sulphate from the crystallization liquor, conducting the liquor remaining after the recovery of said hydrated sodium sulphate to said reaction zone, adding sulphuric acid to said recation zone, generating chorine dioxide and chlorine from the reaction mixture in said reaction zone, removing said chlorine dioxide and said chlorine gases from said reaction zone, conducting the liquid effluent from said reaction zone to said crystallization zone, and removing water from said reaction zone to maintain the acid concentration in the reaction zone in excess of that in the crystallization zone, the amount of water added to said crystallization zone being sufficient to result in crystallization of hydrated sodium sulphate.

2. The process according to claim 1 wherein the amount of sodium in the crystallized sodium sulphate is equivalent to substantially all of the sodium in the said sodium chloride and sodium chlorate added to the said crystallization zone.

3. A process according to claim 2 wherein the process steps are conducted continuously.

4. A process according to claim 3 wherein water is removed from said reaction zone by conducting the liquid effluent from said reaction zone to an evaporating zone, evaporating water from said effluent in said evaporating zone, and returning the concentrated liquid effluent produced in said evaporating zone to said reaction zone.

5. A process according to claim 1 wherein the normality of the acid in the crystallization zone is between about 1.5 and about 4.6.

6. A process according to claim 1, wherein the temperature of the crystallization zone is between about −5° C. and about −28° C.

7. A process according to claim 1, wherein the temperature of the crystallization zone is about −15° C.

8. A process according to claim 1 wherein at least a part of the water added to said crystallization zone is employed to wash said hydrated sodium sulphate before said water is added to said crystallization zone.

9. A process according to claim 1 wherein the molarity of the acid in the reaction zone is between about 4 and about 6 H₂SO₄.

10. A process according to claim 9 wherein the molarity of the acid in the reaction zone is maintained substantially constant.

11. A process according to claim 10 wherein the molarity of the acid in the reaction zone is about 5 molar H₂SO₄.

12. A process according to claim 1 wherein at least part of the sodium chloride and water to be added to the crystallization zone is replaced with hydrochoric acid.

13. The process according to claim 1 wherein the hydrated sodium sulfate recovered is Na₂SO₄·10H₂O.

14. The process according to claim 1 wherein the amount of sulfuric acid added is equivalent to substantially all of the alkali metal of the chlorate and chloride fed to the crystallization zone.

(References on following page)

References Cited

UNITED STATES PATENTS

| | | | |
|---|---|---|---|
| 1,313,192 | 8/1919 | Kee | 23—121 |
| 2,086,902 | 7/1937 | Doennecke et al. | 23—121 |
| 2,811,420 | 10/1957 | Pernert | 23—121 X |
| 2,863,722 | 12/1958 | Rapson | 23—152 |
| 2,895,801 | 7/1959 | Northgraves et al. | 23—152 |
| 3,257,176 | 6/1966 | Nakai | 23—121 |

FOREIGN PATENTS

| | | |
|---|---|---|
| 133,195 | 6/1949 | Australia. |
| 219,907 | 2/1959 | Australia. |

OTHER REFERENCES

J. W. Mellor's "A Comprehensive Treatise on Inorganic and Theoretical Chemistry," Vol. 2, 1922 ed., page 667, Longmans, Green & Co., N.Y.

OSCAR R. VERTIZ, *Primary Examiner.*

EDWARD STERN, *Examiner.*